United States Patent [19]
Ashdown et al.

[11] Patent Number: 5,586,141
[45] Date of Patent: Dec. 17, 1996

[54] INTERFACE PROTOCOL METHOD FOR USE IN A FREQUENCY HOPPING RADIO SYSTEM HAVING FIRST HOPPING CODE FOR SYNCHRONIZATION AND SECOND HOPPING CODE FOR COMMUNICATION

[75] Inventors: Michael B. Ashdown, High Wycombe, England; Philip A. Young, Camberley, Great Britain

[73] Assignee: VTECH Communications, Ltd., Hong Kong, Hong Kong

[21] Appl. No.: 252,367

[22] Filed: Jun. 1, 1994

[30] Foreign Application Priority Data

Jun. 2, 1993 [GB] United Kingdom ............... 9311340

[51] Int. Cl.⁶ ............... H04K 1/04; H04L 27/30
[52] U.S. Cl. ............... 375/202; 380/34; 380/48; 375/367
[58] Field of Search ............... 375/202, 200, 375/201, 203, 204, 208, 209, 210, 365, 366, 367, 368; 370/107, 18, 19; 380/34, 48

[56] References Cited

U.S. PATENT DOCUMENTS

| | | | |
|---|---|---|---|
| 4,193,030 | 3/1980 | Rabow et al. | 375/202 |
| 4,355,399 | 10/1982 | Timor | 375/202 |
| 4,558,453 | 12/1985 | Mimken | 375/202 |
| 4,606,040 | 8/1986 | David et al. | |
| 5,029,180 | 7/1991 | Cowart | 375/206 |
| 5,144,668 | 9/1992 | Malek et al. | 380/48 |
| 5,303,260 | 4/1994 | Fonnesbeck et al. | 375/200 |
| 5,307,371 | 4/1994 | Juola | 375/202 |
| 5,339,331 | 8/1994 | Beauchamp et al. | 375/202 |
| 5,371,783 | 12/1994 | Rose et al. | |
| 5,504,750 | 4/1996 | Fulghum et al. | 370/95.1 |

*Primary Examiner*—Wellington Chin
*Assistant Examiner*—William Luther
*Attorney, Agent, or Firm*—Dick and Harris

[57] ABSTRACT

A method of communicating between two or more radios each capable of transmitting and receiving signals between one another on two or more radio channels wherein the radios hop from channel to channel in a pseudo-random sequence. The method comprises establishing hop synchronization between the radios utilizing a first cycle and operating the radios in a communication mode utilizing a second cycle. The first cycle is shorter than the second cycle so as to facilitate rapid synchronization while preserving the benefits and security obtained through the use of longer cycle length during communication mode.

16 Claims, 2 Drawing Sheets

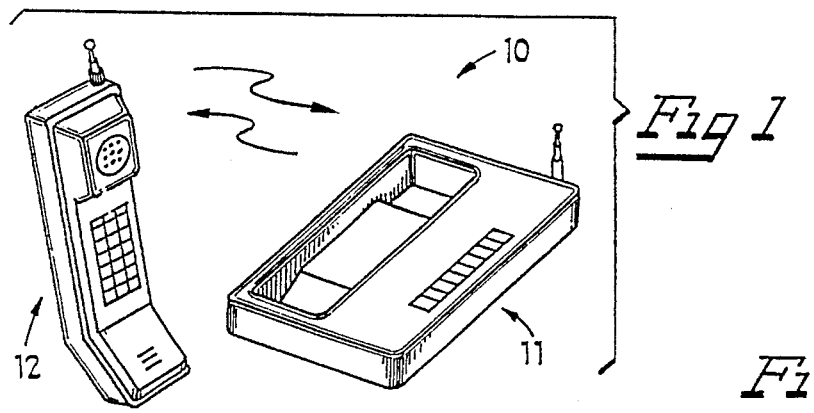
Fig 1
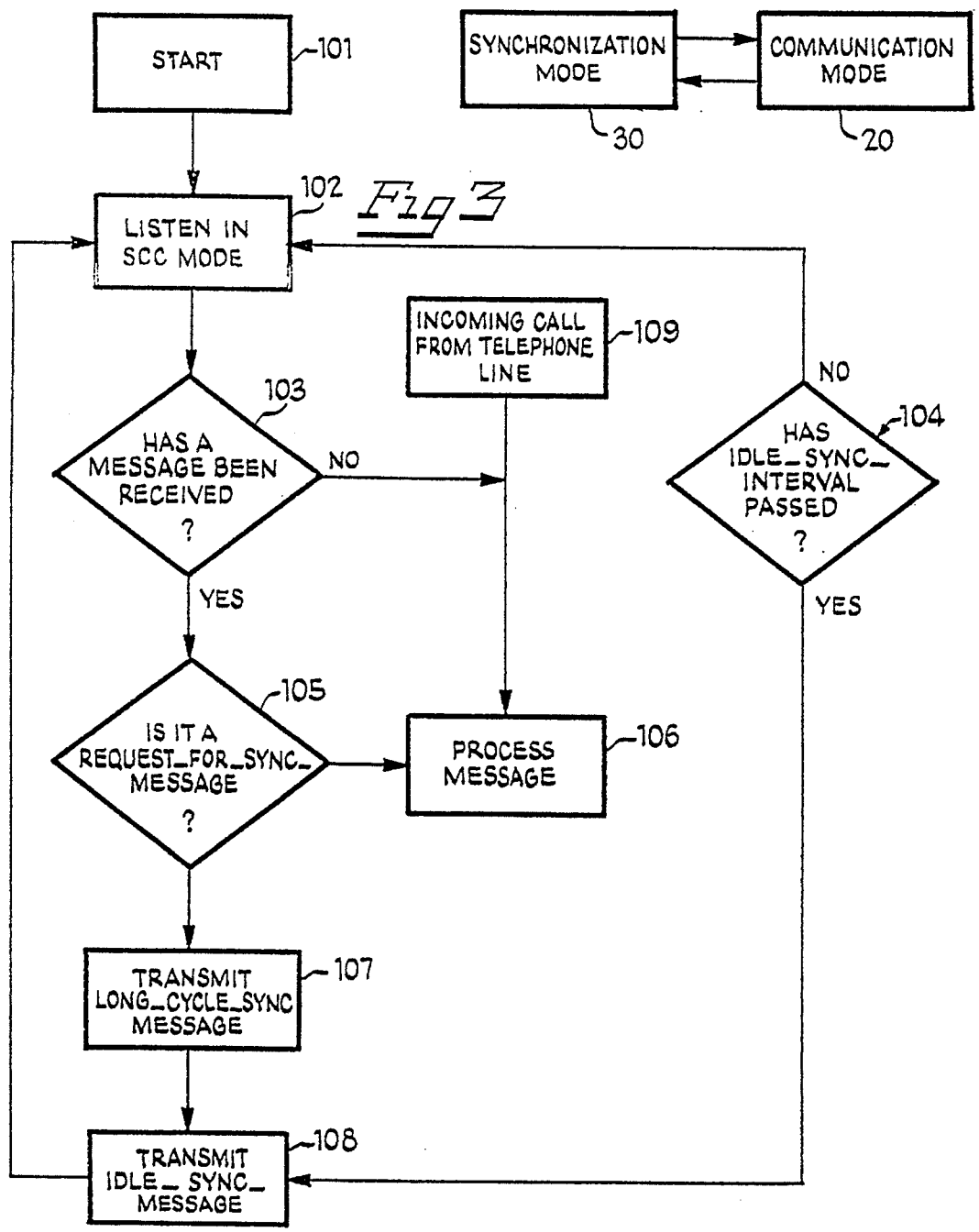
Fig 2
Fig 3

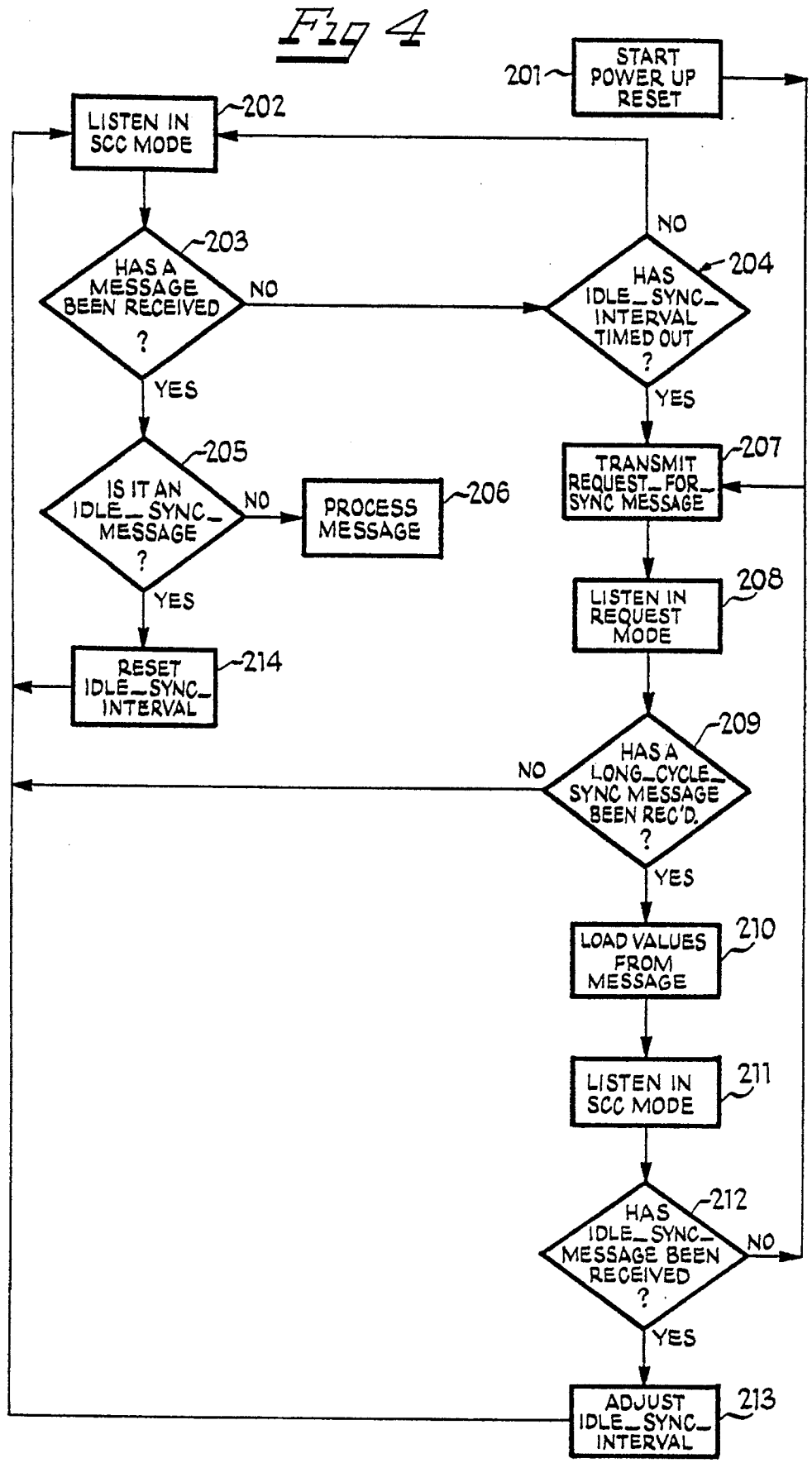

INTERFACE PROTOCOL METHOD FOR USE IN A FREQUENCY HOPPING RADIO SYSTEM HAVING FIRST HOPPING CODE FOR SYNCHRONIZATION AND SECOND HOPPING CODE FOR COMMUNICATION

BACKGROUND OF THE INVENTION

1. Field Of The Invention

The present invention relates in general to a transmission and reception protocol and, in particular, to a method of communicating between two or more radio transmitter/receivers utilizing a first pseudo-random cycle for synchronization and a second pseudo-random cycle for communication.

2. Background Art

Some radio transmitter/receivers, such as some cordless telephones, citizen band radios and the like, utilize spread spectrum technology. One type of spread spectrum communication is called frequency hopping, wherein each associated radio transmitter/receiver hops from channel to channel in a psuedo random sequence. The benefits of spreading transmission among numerous channels in the available spectrum include evenly utilizing the available spectrum and avoiding "fast fading" concerns.

Given the proliferation of this type of radio, particularly cordless telephones, an infinite number of channels is desirable to achieve minimal interference. However, due to regulations, available spectrum and radio characteristics, this number is relatively restricted. Within this relatively restricted number of channels it would be optimal to select each channel in a truly random fashion. However, it is clear that if selection were truly random it would not be practical to synchronize the channel selection at the receiver and the transmitter, hence some form of pseudo-random channel selection is used.

It is a characteristic of pseudo-random sequences that after a finite number of selections the sequence will repeat. In order to approximate a truly random sequence the repeat period, or "cycle," of the pseudo-random sequence needs to be very long. The result of all these constraints has been radio transmitter/receivers which hop over typically dozens of channels using pseudo-random sequences with very long cycle times.

Where pseudo-random cycle times are very long, synchronization of two radio transmitter/receivers becomes difficult. One approach has been to provide additional information, such as a small number of designated control channels upon which a "master" radio always transmits synchronization information to control a "slave" radio. Thus, an unsynchronized slave radio merely needs to sit and wait on a control channel for the master radio to hop onto the channel and transmit the synchronization information. This approach assumes that communication is continuous and only the master initiates communications. However, particularly in the case of cordless telephones, these assumptions are invalid. In fact, cordless telephones communicate at irregular, infrequent intervals and communication may be initiated by either the master (base unit) or the slave (handset).

It is thus an object of the present invention to provide a quick method of establishing synchronization between a master radio transmitter/receiver and one or more slave radio transmitter/receivers without the need for extended transmission periods by the master radio transmitter/receiver.

It is an associated object of the present invention to provide two types of pseudo random codes for generating the hopping cycles, wherein the one type of code that is used while the radios are idle—and only intermittently transmitting—is much shorter than the other code, which is utilized during continuous communications to achieve the full benefit of spread spectrum technology.

These and other objects of the invention will become apparent in light of the attached specification and claims.

SUMMARY OF THE INVENTION

A preferred embodiment of the present invention comprises a method of communicating between two or more radio transmitter/receivers one of which may be the "master" transmitter/receiver, while the remaining one or more are "slave" transmitter/receivers. This method is particularly applicable to an embodiment wherein the radio transmitter/receivers are capable of transmitting and receiving signals on two or more radio channels while hopping from channel to channel in a pseudo-random sequence.

The method comprises establishing synchronization between the radio transmitter/receivers such that they are hopping from channel to channel in synchronization with one another utilizing a first cycle.

The method further comprises operating the radio transmitter/receivers in a communication mode wherein the radio transmitter/receivers hop from channel to channel in synchronization with one another utilizing a second cycle.

The first cycle, which may be generated using a first cycle code, is shorter than the second cycle, which may be generated using a second cycle code, so as to facilitate rapid synchronization while preserving the benefits and security obtained through the use of a longer length cycle during communication mode.

In a preferred embodiment, one radio transmitter/receiver will request a communication link while in the first cycle, thus causing the radio transmitter/receivers to switch from the first cycle to the second cycle as the radio transmitter/receivers begin to operate in communication mode.

In a preferred embodiment, establishing and maintaining synchronization between the radio transmitter/receivers includes a method for determining whether the slave has lost synchronization with the master. This determination is made by transmitting from the master to the slave a sync marker at regular predetermined times while each radio transmitter/receiver hops from channel to channel using the first cycle. The slave listens at the predetermined time for the incoming sync marker transmitted by the master while hopping from channel to channel using the first cycle. If the sync marker is received the slave resets an idle sync interval timer and synchronization is deemed to exist. However, if the slave fails to receive the sync marker at the predetermined time, the slave deems synchronization to have been lost. After recognizing that synchronization has been lost the slave transmits to the master a request for synchronization.

The slave transmits the request to synchronize to the master utilizing a third cycle. This third cycle, in a preferred embodiment, comprises cycling through the first cycle backward and at twice the hopping rate of the first cycle. In a preferred embodiment this is achieved by calculating the values which the first cycle will take and storing these values in a look-up table so as to facilitate the backward cycling of the third cycle.

The master receives this synchronization request while listening for incoming messages from the slave while the master, itself, is hopping from channel to channel using the first cycle. In this manner the cycles executed by the slave and master will intersect. Upon detecting an incoming request for sync message from the slave, the master transmits a sync message to the slave. In a preferred embodiment, the master continuously transmits the sync marker for at least two hopping cycles plus two additional hops in the first cycle.

The slave having paused upon completing transmission of the request for sync message using the third cycle listens for the sync message which, when detected, is captured. The slave thus synchronizes itself to the master utilizing the received sync message. In a preferred embodiment, after receiving the sync message, the slave begins to hop substantially in sync with the master and immediately listens for a subsequent sync marker transmitted from the master so it can fine tune the synchronization between the master and the slave.

One advantage of the present method for synchronization is that it requires only intermittent transmissions between master and slave, thus spectrum utilization is substantially reserved for communication mode.

BRIEF DESCRIPTION OF THE DRAWINGS

FIG. 1 of the drawings is a flow diagram of one potential system in which the present method may be utilized;

FIG. 2 of the drawings is a flow diagram of the method of communication;

FIG. 3 of the drawings is a flow diagram synchronization step showing, in part, the master radio transmitter/receiver activity; and FIG. 4 of the drawings is a flow diagram, synchronization step showing, in part, the master slave activity.

DETAILED DESCRIPTION OF THE DRAWINGS

While this invention is susceptible of embodiment in many different forms and in many different systems, there is shown in the drawings and will herein be described in detail, one specific embodiment in one exemplary system with the understanding that the present disclosure is to be considered as an exemplification of the principles of the invention and is not intended to limit the invention to the embodiments illustrated.

The method of communicating between two or more radio transmitter/receivers disclosed in the present application is for use in a system like the one shown in FIG. 1 of the drawings. Cordless telephones, like the one shown in FIG. 1, typically have a base unit and at least one portable unit. The base unit and at least one portable unit communicate with one another over radio frequencies or channels. Both the base unit and each handset are capable of transmitting and receiving signals between one another on two or more radio channels. Some of these cordless telephones, such as cordless telephone 10 utilize frequency hopping, which involves hopping from channel to channel, such that transmission and reception occur only on the current channel, which is utilized only for a short period of time (on the order of ten milliseconds).

Cordless telephone 10 operates in communication mode 20 wherein base unit 11 and handset 12 hop from channel to channel in synchronization with one another while communicating over an open communications channel 13. Ideally, a frequency hopping communication system, like cordless telephone 10, utilizes an infinite number of transmission channels, which are addressed in a totally random manner so as to provide better transmission characteristics and even utilization of the frequency spectrum. The number of available channels, however, is typically restricted by governmental regulation, the available spectrum and radio frequency characteristics, such that there are considerably less than an infinite number of channels available. In a preferred embodiment, cordless telephone 10 utilizes sixty-four transmission channels, however, a different number of channels may be utilized realizing that the fewer the number of channels the less the benefit achieved.

Accessing the available transmission channels in a totally random manner is impractical. If frequency hopping were truly and totally random, base unit 11 and handset 12 could never be synchronized and thus could never communicate. Accordingly, frequency hopping radios utilize pseudo-random number generators to determine the hop sequence such that the hop sequence appears to be non-repetitive by utilizing a lengthy sequence. However, the length may frustrate any attempts at synchronization.

Cordless telephone 10 utilizes a method for communicating between base unit 11 and handset 12 wherein during communication mode (i.e. a voice conversation or data transmission) the hopping sequence is derived utilizing a second cycle code.

Cordless telephone 10 operates predominantly in idle mode 30 wherein no conversation occurs and thus there is no need for a continually open communication channel. In reality, actual communication is very irregular and generally quite infrequent. Furthermore, given spectrum utilization concerns—particularly in light of the proliferation of cordless telephones, citizen band radios and like—idle mode 30 should contain no continuously open communication channel. However, during idle mode 30, base unit 11 and handset 12 must be in sync, such that when a user desires to make a call or a call is received on the telephone line, cordless telephone 10 can respond quickly and appropriately by switching into communication mode 20.

Establishing and maintaining synchronization between base unit 11 and handset 12 must occur while base unit 11 and handset 12 are frequency hopping and not continually transmitting. It would be unreasonable to wait sixteen months for the second cycle to repeat such that base unit 11 and handset 12 can be synchronized. Other alternatives such as maintaining an open communication channel or utilizing expensive clocks are either unreasonable or too expensive. Thus, the present method utilizes a first cycle during idle mode 30, wherein the first cycle is shorter than the second cycle so as to facilitate rapid synchronization. The second cycle, as described above, is utilized during communication mode 20 so as to preserve the benefits obtained through the use of longer cycle length.

The first cycle comprises the values generated by a short cycle code. In a preferred embodiment, the short cycle code is derived from feedback shift registers using a 6th order irreducible polynomial to determine the feedback connections. This arrangement affords $2^6-1$ or 63 addresses. This in combination with a zero address allows the first cycle to address the available channels. The first cycle is thus much shorter than the second cycle and provides for easier synchronization of handset 12, the slave, to base unit 11, the master.

It should be noted that the only constraint on the number of transmission channels versus the first and second cycle codes is that the number of transmission channels be less than or equal to $2^n$, where n is the order of the short cycle code (first cycle). The number of transmission channels need not be a power of two, because tricks can be played with the sequence generators to provide the necessary numbers.

The preferred embodiment of the method utilizes a third cycle while attempting to regain synchronization. The values for the first cycle are calculated off-line and stored into a look-up table, such that third cycle, which merely steps through the first cycle backward and at twice the hopping rate utilized in the first cycle, can be generated from this look-up table.

Handset 12 must synchronize to base unit 11 on power up and also when sync is lost. The method for synchronizing handset 12 to base unit 11 discussed assumes base unit 11 to be considered the master and handset 12 the slave. This method is depicted in FIGS. 3 and 4. FIG. 3 shows the process loop the master, i.e. base unit 11, follows during idle mode 30. Base unit 11 is powered up in step 101 setting its counters and variables, and seeding the first and second cycles such that they can both begin to cycle. Once the initialization has finished, the main cycle of idle mode 30 begins.

The default operation for base unit 11 is listening for messages, step 102, while frequency hopping from channel to channel in the first (shorter) cycle. Steps 102, 103, 104 and 105 are shown as separate steps merely for explanatory purposes, in fact, these "steps" occur simultaneously in real time while listening on the channels dictated by the first cycle. While hopping in first cycle, the second cycle continues to be generated although it goes unused until communication mode 20 is entered. While listening for message, step 102, base unit 11 is determining whether a message has been received, step 103. Step 103 includes reviewing any received message to determine if it was sent by an authorized handset, such as handset 12, such that messages from unauthorized handsets are not acted upon.

While listening for messages, step 102, base unit 11 is watching to see if the IDLE_SYNC_INTERVAL has timed-out, step 104. The value of IDLE_SYNC_INTERVAL depends upon the frequency tolerance of the master oscillator (not shown) found within base unit 11. Base unit 11 merely continues to listen for messages until the interval has passed. However, once the interval passes, base unit 11 continues onto step 108, wherein base unit 11 transmits an IDLE_SYNC message on the current channel as determined by the first cycle for eight successive hops in a preferred embodiment. After transmitting the IDLE_SYNC message, base unit 11 returns to listen for messages in step 102.

FIG. 4 shows the processing loop the slave, i.e. handset 12, follows during idle mode 30. Handset 12 is powered up in step 201 setting its counters and variables, and seeding the first and second cycles such that they can both begin to cycle. Once the initialization has finished, handset 12 will seek to immediately attempt to synchronize to base unit 11. This is necessary because, base unit 11 and handset 12 seed the first and second cycles with different seeds and thus they are unlikely to be in synchronization.

Handset 12 first transmits a REQUEST_FOR_SYNC message to base unit 11, step 207. In a preferred embodiment, step 207 comprises the handset 12 transmitting the REQUEST_FOR_SYNC message three times per hop, with handset 12 hopping in a third cycle. This third cycle, as mentioned above, may involve stepping backward through the first cycle or alternatively operate in another mode. In this embodiment, the third cycle is run at twice the hop rate at which the first and second cycles are run or five milliseconds per hop. Thus, while base unit 11 is listening in step 102 hopping in the first cycle, handset 12 is hopping in the reverse of the first cycle at twice the rate—i.e. the third cycle. This guarantees that base unit 11 will have two opportunities to receive at least one REQUEST_FOR_SYNC message.

In a preferred embodiment, the REQUEST_FOR_SYNC message includes—beside the handset ID code—the channel upon which handset 12 will stop and listen for the LONG_CYCLE_SYNC message to be sent by base unit 11.

The LONG_CYCLE_SYNC message contains the position of base unit 11 within the first and second cycles during each hop, such that as base unit 11 continues through the first cycle it continuously updates the LONG_CYCLE_SYNC message to reflect the current position for both cycles. Returning to FIG. 3, wherein base unit 11 having received a REQUEST_FOR_SYNC message is listening step 102 and receiving step 103 detects the message as a REQUEST_FOR_SYNC message, step 105. This causes base unit 11 to transmit the LONG_CYCLE_SYNC message to handset 12, step 107. This transmission occurs in the first cycle and, in a preferred embodiment, base unit 11 transmits the LONG_CYCLE_SYNC message throughout two passes through the first cycle plus two hops to guarantee that handset 12 receives the LONG_CYCLE_SYNC message, step 209. After base unit 11 completes step 107, it will transmit IDLE_SYNC message, step 108.

Handset 12 waits on the selected frequency for sufficient time for base unit 11 to complete the first cycle twice. If the LONG_CYCLE_SYNC message is received during the time, handset 12 immediately loads the location of base unit 11 in both the first and second cycles into the first and second cycle code generators respectively, step 210. Handset 12 then begins hopping on the next channel in the first cycle listening for an IDLE_SYNC message in step 211. Step 211 allows handset 12 to fine tune the synchronization by determining the exact receipt time of the IDLE_SYNC message sent by base unit (step 108) and resetting its frame alignment and IDLE_SYNC_INTERVAL timer accordingly, shown in steps 212 and 213. Thereafter handset 12 continues into the main loop for idle mode 30.

This method of synchronization could be used while in the second cycle, realizing, however, that the timing required for this approach would be greater than that required by the approach described above. Furthermore, it should be noted that in communication mode 20, wherein an open channel continually exists, synchronization is maintained by utilizing sync message intermixed within the voice and/or data packets.

Idle mode 30 main loop of handset 12 is almost identical to that of base unit 11. The default for handset 12 is listening for messages, step 202 while frequency hopping from channel to channel in the first cycle. Steps 202, 203, 204 and 205 are shown as separate steps merely for explanatory purposes, in fact, these "steps" occur simultaneously in real time while listening on the channels dictated by the first cycle. While hopping in first cycle, the second cycle continues to be generated though not used until communication mode 20 is entered. While listening for messages, step 202, handset 12 is determining whether a message has been received, step 203. Step 203 includes reviewing any received message to determine if it was sent by an authorized master, such as base unit 11.

While listening for messages in step 202, handset 12 watches to see if the IDLE_SYNC_INTERVAL has timed-out, step 204. The value of IDLE_SYNC_INTERVAL depends upon the frequency tolerance of the master oscillator (not shown) found within base unit 11. Handset 12 merely continues to listen for messages until the interval has passed.

If handset 12 has not received the IDLE_SYNC message before the IDLE_SYNC_INTERVAL times out, step 204, handset 12 recognizes that synchronization has been lost and begins the REQUEST_FOR_SYNC transmission, step 207.

The purpose of idle mode 30 is to maintain synchronization such that when communication is desired a switch to communication mode 20 can be almost instantaneous. Thus, by listening for IDLE_SYNC messages and responding appropriately, when base unit 11 or handset 12 receives a process message in steps 103 and 203, respectively, rather than a synchronization message, each can process the message, step 106, after which they both switch to the second cycle so as to secure communication in communication mode 20.

The foregoing description and drawings merely explain and illustrate the invention and the invention is not limited thereto, except insofar as the appended claims are so limited and as those skilled in the art who have the disclosure before them will be able to make modification and variations therein without departing from the scope of the invention.

What is claimed is:

1. A method of communicating between two or more radio transmitter/receivers, for use in a system having:

two or more radio transmitter/receivers which communicate with one another, each of the two or more radio transmitter/receivers being capable of transmitting and receiving signals between one another on two or more radio channels, the method comprising the steps of:

synchronizing the two or more radio transmitter/receivers while each of the two or more radio transmitter/receivers are hopping between the two or more radio channels in a first pseudo-random cycle; and communicating between at least two of the two or more radio transmitter/receivers while each of the at least two of the two or more transmitter/receivers are hopping between the two or more radio channels in a second pseudo-random cycle, said second pseudo-random cycle being substantially longer than said first pseudo-random cycle;

wherein the first cycle is shorter than the second cycle so as to facilitate rapid synchronization while preserving the benefits and security obtained through the use of longer cycle length during active communication.

2. The invention according to claim 1 wherein the invention further comprises the step of generating the first cycle using a first pseudo-random cycle code.

3. The invention according to claim 1 wherein the invention further comprises the step of generating the second cycle using a second cycle code.

4. The invention according to claim 1 wherein the invention further comprises the step of switching the at least two of the two or more radio transmitter/receivers from the first pseudo-random cycle to the second pseudo-random cycle after the step of synchronizing and before the step of communicating.

5. The invention according to claim 1 wherein one of the two or more radio transmitter/receivers is a master and the remaining one or more radio transmitter/receivers are slaves, the step for one particular slave of synchronizing the two or more radio transmitter/receivers includes the sub-steps of:

determining whether the one particular slave has lost synchronization with the master;

transmitting from the one particular slave to the master a request to synchronize the master and one particular slave upon losing synchronization between the master and the one particular slave utilizing a third pseudo-random cycle, said third pseudo-random cycle comprising a reverse cycle of said first pseudo-random cycle;

receiving on the master the request to synchronize;

transmitting from the master to the one particular slave a sync message in response to the master detecting the request to synchronize; and synchronizing the one particular slave to the master utilizing the sync message received by the one particular slave.

6. A method for synchronizing a particular slave radio transmitter/receiver to a master radio transmitter/receiver, for use in a system having:

a master radio transmitter/receiver and one or more slave radio transmitter/receivers each of which communicate with the master radio transmitter/receiver, each of the master radio transmitter/receiver and one or more slave radio transmitter/receivers being capable of transmitting and receiving signals between one another on two or more radio channels, operation among the master radio transmitter/receiver and one or more slave transmitter/receivers take place using both a first pseudo-random cycle and a second pseudo-random cycle, the second pseudo-random cycle being substantially longer than the first pseudo-random cycle, the first cycle being utilized during synchronization of the master radio transmitter/receiver and the one or more slave radio transmitter/receivers, the second cycle being utilized during active communication between the master radio transmitter/receiver and the particular slave radio transmitter receivers, the method comprising the steps of:

determining whether the particular slave radio transmitter/receiver has lost synchronization with the master radio transmitter/receiver;

transmitting from the particular slave radio transmitter/receiver to the master radio transmitter/receiver a request to synchronize the master radio transmitter/receiver and the particular slave radio transmitter/receiver upon losing synchronization between the master radio transmitter/receiver and the particular slave radio transmitter/receiver utilizing a third pseudo-random cycle, said third pseudo-random cycle comprising a reverse cycle of the first psseudo-random cycle;

receiving on the master radio transmitter/receiver the request to synchronize;

transmitting from the master radio transmitter/receiver to the particular slave radio transmitter/receiver a sync message in response to the master radio transmitter/receiver detecting the incoming request to synchronize; and synchronizing the particular slave radio transmitter/receiver to the master radio transmitter/receiver utilizing the sync message received by the particular slave radio transmitter/receiver.

7. The invention according to claim 6 wherein the step of determining comprises the sub-steps of:

transmitting from the master radio transmitter/receiver to the particular slave a sync marker at a predetermined time while hopping between the two or more radio channels using the first cycle;

listening in the particular slave radio transmitter/receiver at the predetermined time for the sync marker while hopping between the two or more radio channels using the first pseudo-random cycle;

resetting an idle sync interval timer in the particular slave radio transmitter/receiver in response to receiving the sync marker at the predetermined time; and recognizing that synchronization has been lost upon failure to receive the incoming sync marker in the particular slave radio transmitter/receiver at the predetermined time;

recognizing that synchronization has been lost upon failure to receive the incoming sync marker in the particular slave radio transmitter/receiver at the predetermined time.

8. The invention according to claim 6 wherein the step of receiving includes the sub-step of listening on the master radio transmitter/receiver for the request to synchronize while hopping between the two or more radio channels using the first pseudo-random cycle.

9. The invention according to claim 6 wherein the method further includes the step of stopping the particular slave radio transmitter/receiver on a selected channel after the step of transmitting the request for synchronization until the particular slave radio transmitter/receiver receives the sync message from the master radio transmitter/receiver.

10. The invention according to claim 9 wherein the step of transmitting from the master radio transmitter/receiver to the particular slave radio transmitter/receiver occurs only on the selected channel while the master radio transmitter/receiver continues hopping between the two or more radio channels using the first pseudo-random cycle.

11. The invention according to claim 6 wherein the step of transmitting a sync message from the master radio transmitter/receiver to the particular slave radio transmitter/receiver continues hopping between the two or more radio channels using the first pseudo-random cycle for at least one complete sequence through the first pseudo-random cycle.

12. The invention according to claim 6 wherein the step of synchronizing includes the sub-steps of:

deriving a current position of the master radio transmitter/receiver within the first and second pseudo-random cycles from the sync message; and matching the current position of the particular slave radio transmitter/receiver within the first and second pseudo-random cycles to the derived position of the master radio transmitter/receiver.

13. The invention according to claim 12 wherein the step of synchronizing further includes the sub-step of receiving a sync marker in the particular slave radio transmitter/receiver from the master radio transmitter/receiver so as to fine tune the synchronization between the master radio transmitter/receiver and the slave radio transmitter/receiver.

14. The invention according to claim 6 wherein the step of transmitting the request to synchronize occurs at twice the hopping rate of the first pseudo-random cycle.

15. A method for synchronizing a slave radio transmitter/receiver to a master radio transmitter/receiver, for use in a system having:

a master radio transmitter/receiver and one or more slave radio transmitter/receivers which each communicate with the master radio transmitter/receiver, the master and one or more slave radio transmitter/receivers being capable of transmitting and receiving signals between one another on two or more radio channels wherein the master and one or more slave transmitter/receivers hop between the two or more radio channels in a pseudo-random sequence, operation among the master and one or more slave transmitter/receivers take place using both a first pseudo-random cycle and a second pseudo-random cycle, the first pseudo-random cycle being utilized during synchronization of the master and a particular one of the one or more slave radio transmitter/receivers, the second pseudo-random cycle being utilized during active communication between the master and the particular one of the one or more slave radio transmitter/receivers, the method comprising the steps of:

determining whether the particular one of the one or more slave radio transmitter/receivers has lost synchronization with the master radio transmitter/receiver, wherein the step includes the sub-steps of:

transmitting from the master radio transmitter/receiver to the particular one of the one or more slave radio transmitter/receivers a sync marker at a predetermined time while hopping between the two or more radio channels using the first pseudo-random cycle;

listening to the particular one of the one or more slave radio transmitter/receivers at the predetermined time for the sync marker transmitted by the master radio transmitter/receiver while hopping between the two or more radio channels using the first pseudo-random cycle;

resetting an idle sync interval timer in response to receiving the sync marker at the predetermined time;

recognizing that synchronization has been lost upon failure to receive the incoming sync marker at the predetermined time;

transmitting from the particular one of the one or more slave radio transmitter/receivers to the master radio transmitter/receiver a request to synchronize after determining that synchronization has been lost between the master and the slave utilizing a third pseudo-random cycle, the third pseudo-random cycle comprising a reverse cycle of the first pseudo-random cycle;

receiving in the master radio transmitter/receiver the request to synchronize, wherein the step of receiving includes the sub-step of:

listening on the master radio transmitter/receiver for the request to synchronize while hopping between the two or more radio channels using the first pseudo-random cycle;

transmitting from the master radio transmitter/receiver to the particular one of the one or more slave radio transmitter/receivers a sync message in response to the master radio transmitter/receiver detecting the request to synchronize; and synchronizing the particular one of the one or more slave radio transmitter/receivers to the master radio transmitter/receiver utilizing the sync message received by the slave, wherein the step of synchronizing includes the substeps of:

deriving a current position of the master radio transmitter/receiver within the first and second pseudo-random cycles from the sync message; and matching the current position of the one particular slave radio transmitter/receiver within the first and second pseudo-random cycles to the derived position of the master radio transmitter/receiver.

16. The invention according to claim 6 including the sub-step of storing the first pseudo-random cycle in a lookup table to facilitate the step of transmitting the request to synchronize utilizing the third pseudo-random cycle.

* * * * *